(12) United States Patent
Allam et al.

(10) Patent No.: US 6,615,589 B2
(45) Date of Patent: Sep. 9, 2003

(54) PROCESS AND APPARATUS FOR THE GENERATION OF POWER

(75) Inventors: Rodney John Allam, Guildford (GB); Rebecca Cotton, New Malden (GB)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 09/965,969

(22) Filed: Sep. 27, 2001

(65) Prior Publication Data

US 2002/0121092 A1 Sep. 5, 2002

(30) Foreign Application Priority Data

Oct. 18, 2000 (GB) .............................................. 0025552

(51) Int. Cl.[7] .................................................. F02C 3/28
(52) U.S. Cl. ...................... 60/780; 60/39.12; 60/39.182
(58) Field of Search ........................... 60/39.12, 39.182, 60/780, 781

(56) References Cited

U.S. PATENT DOCUMENTS

| | | | | |
|---|---|---|---|---|
| 4,999,992 A | * | 3/1991 | Nurse ........................... | 60/781 |
| 5,440,871 A | * | 8/1995 | Dietz et al. .................... | 60/781 |
| 6,130,259 A | * | 10/2000 | Waycuilis ................... | 60/39.12 |
| 6,145,295 A | * | 11/2000 | Donovan et al. ......... | 60/39.182 |
| 6,167,691 B1 | * | 1/2001 | Yoshikawa et al. ......... | 60/39.12 |
| 6,223,519 B1 | * | 5/2001 | Basu et al. ................ | 60/39.12 |

FOREIGN PATENT DOCUMENTS

| | | |
|---|---|---|
| GB | 1448652 | 9/1976 |
| GB | 1525490 | 9/1978 |

* cited by examiner

*Primary Examiner*—Michael Koczo
(74) *Attorney, Agent, or Firm*—Willard Jones, II

(57) ABSTRACT

A process for generating power from the expansion of steam in a steam turbine system. The steam is generated by at least partially vaporizing pre-heated water by heat exchange against a first fuel gas that is generated exothermically. The at least partially vaporized water is then heated to produce the steam by heat exchange against expanded combustion product gas that is generated by the combustion of a second fuel gas in the presence of compressed oxygen-containing gas and the subsequent expansion of the combustion product gas. The steam is then expanded in a steam turbine system having more than one pressure stage to produce power and an expanded steam stream.

17 Claims, 5 Drawing Sheets

US 6,615,589 B2

PROCESS AND APPARATUS FOR THE GENERATION OF POWER

TECHNICAL FIELD OF THE INVENTION

The present invention relates generally to the field of power generation and, in particular, to the generation of power from stream using a steam turbine system.

BACKGROUND OF THE INVENTION

Many processes for the generation of power from steam operate using two stages, the first stage involving the production of a gaseous fuel and the second stage involving the use of the fuel to generate steam which is expanded to produce power.

GB-A-1525490 (Klein et al; published on Sep. 20, 1978) discloses a power generation process in which a fuel is partially combusted in the presence of compressed air. A proportion of the heat liberated is used to produce steam from pre-heated water. The combustion gases are then cleaned, freed of $H_2S$, mixed with compressed air and then combusted completely. The resultant combustion gases drive a turbine. The gases leaving the turbine are passed to an off-gas boiler in which steam generated upstream is further heated. The further heated steam is used to drive a steam turbine.

It is known in the art to use hydrocarbon or carbonaceous feedstock to provide fuel for a power generation plant. For example, it is known to convert natural gas to "synthesis gas" (a mixture of hydrogen and carbon monoxide). The gaseous fuel is then fed to a power generation plant comprising a gas turbine system, a heat recovery and steam generation system ("HRSG") and a steam turbine system. The fuel gas is combusted in the presence of a compressed oxidant gas such as air or oxygen to form a mass of hot gaseous combustion products. At least some of the heat generated in the combustion may be recovered in the HRSG by generating steam which is then expanded in the steam turbine system to provide power and expanded steam.

The two stages of these processes are usually independent of each other, the first stage simply supplying the fuel for the second stage.

Conventional steam turbine systems use three pressure levels of steam generation with the expanded steam from the highest pressure turbine being reheated before it is introduced to the medium pressure turbine. A typical steam turbine system is shown as part of a typical two-stage power generation process depicted in FIG. 1.

Referring to FIG. 1, a stream 24 of feed air is compressed C-102 and then fed as a stream 27 to a combustion chamber R-108. A stream 23 of pressurized fuel gas comprising predominantly hydrogen is fed to the combustion chamber R-108 where the air and the fuel are combined and burned and a stream 28 of pressurized gaseous combustion products is removed. This product stream 28 is expanded in a gas turbine T-101 to produce power and a stream 29 of lower pressure gaseous combustion products. Optionally, a stream of nitrogen 76 is added to the combustion chamber R-108 thereby increases the power produced by the expander T-101.

The exhaust 29 from the gas turbine T-101 is typically at about 600° C. and is cooled to approximately 100° C. in the HRSG X-106. A stream 33 of 20° C. water at about atmospheric pressure is fed to the HRSG X-106 in which it is heated to 99° C. The warmed water stream 77 is then removed from the HRSG and de-aerated in de-aerator 78. The de-aerated water 79 is then divided into three streams 80, 87, 93. The stream 80 is pumped in pump 81 to about 4 atm. (0.4 MPa) to produce a low pressure stream 82 which is vaporized in the HRSG X-106 to produce a stream 83 of saturated steam at a temperature of 144° C. that is then fed to a low-pressure stage T-104 of the three-stage steam turbine. The low-pressure turbine T-104 expands the steam and the resultant exhaust stream 84 has a pressure of about 0.04 atm. (4 KPa) and a temperature of about 29° C. The exhaust stream 84 is then condensed X-107 to form stream 85 that is then pressurized in pump P-102 to about 1 atm. (0.1 MPa) to form stream 86. Stream 86 is recycled by addition to the HRSG feed water stream 33.

Stream 87 is pumped in pump 88 to about 35 atm. (3.4 MPa) to form a medium pressure stream 89 which is vaporized in the HRSG X-106 to produce a stream 90, 91 of saturated steam at a temperature of about 243° C. The stream 91 of medium pressure steam is fed to the medium pressure stage T-103 of the steam turbine where it is expanded to a pressure of about 4 atm. (0.4 MPa). The exhaust stream 92 is then fed to the low-pressure stage T-104 of the steam turbine.

Stream 93 is pumped in pump 94 to about 150 atm. (15 MPa) to form a high pressure stream 95 which is vaporized in the HRSG X-106 to produce a stream 96 of superheated steam at a temperature of about 585° C. The superheated steam 96 is then expanded in a high-pressure stage T-102 of the steam turbine to produce a medium pressure stream 97 at about 35 atm. (3.5 MPa). In the prior art process, the medium pressure exhaust stream 97 is then returned to the HRSG X-106 and reheated to about 550° C. The reheated medium pressure stream 98 provides a portion of the feed stream 91 for the medium pressure stage T-103 of the steam turbine.

The graph in FIG. 2 depicts a typical cooling curve for a HRSG in combination with a conventional three level steam turbine system in a process according to the flow sheet in FIG. 1. The ideal rate of cooling, represented by the upper line, would be constant thereby maximizing the efficiency of the process. Use of more pressure levels of steam generation would improve the efficiency of the power generation process as the actual cooling curves in the HRSG would match more closely the ideal cooling curve. However, increasing the number of pressure levels in this way would significantly increases the capital, running and maintenance costs of the process. It is the primary objective of this invention, therefore, for provide a modified process that strikes a balance between performance and cost.

SUMMARY OF THE INVENTION

It has been found that the primary objective of the invention can be achieved by using the heat generated in an exothermic fuel gas generation process to produce the steam for expansion in the steam turbine system. This significantly improves the efficiency of the overall power generation process. The inventors are not aware of any system in which the high pressure steam vaporisation duty is carried out outside the HRSG.

In particular, power is produced from hydrocarbon fuel gas by a process comprising generating exothermically a first fuel gas. An oxidant gas is compressed to produce compressed oxidant gas. A second fuel gas is combusted in the presence of at least a portion of the compressed oxidant gas to produce combustion product gas, at least a portion of which is expanded to produce expanded combustion product gas. Pre-heated water is at least partially vaporized by heat exchange against at least a portion of the first fuel gas to produce an at least partially vaporized water stream. This water stream is heated by heat exchange against expanded combustion product gas to produce a heated first steam stream at a pressure of from 100 atm. (10 MPa) to 200 atm. (20 MPa). The heated first steam stream is expanded in the highest pressure stage of a steam turbine system having more than one pressure stage to generate power and an expanded steam stream.

The latent heat duty for at least partially vaporising the pre-heated water is provided by the first fuel gas rather than by the expanded combustion product gas. Thermal integration of the process in this way improves significantly the overall thermal efficiency of the power generation process.

DETAILED DESCRIPTION OF THE INVENTION

Figure 1:
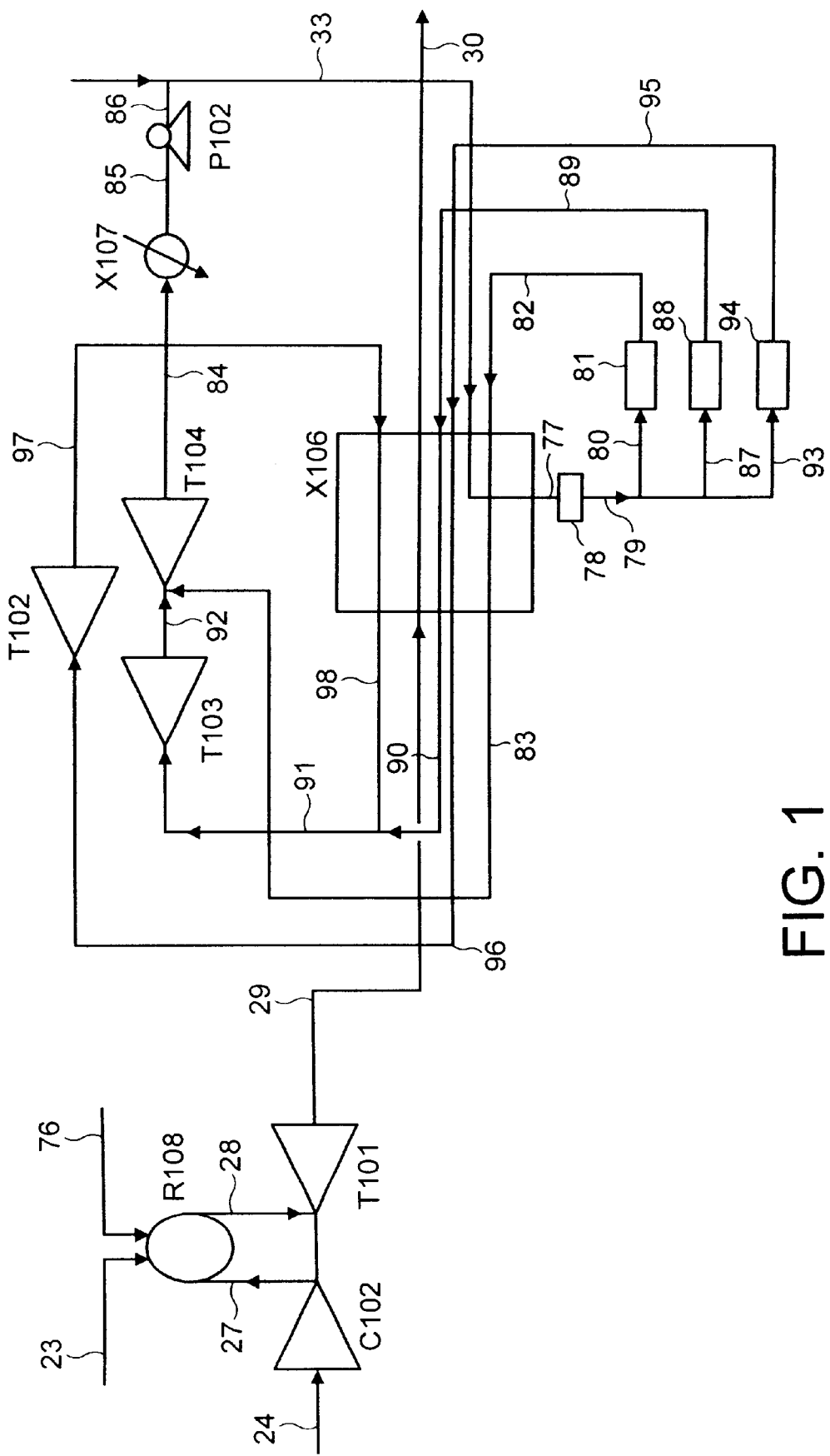
FIG. 1 is a flow sheet of a typical prior art process for the generation of power from the combustion of a fuel gas.
Figure 2:
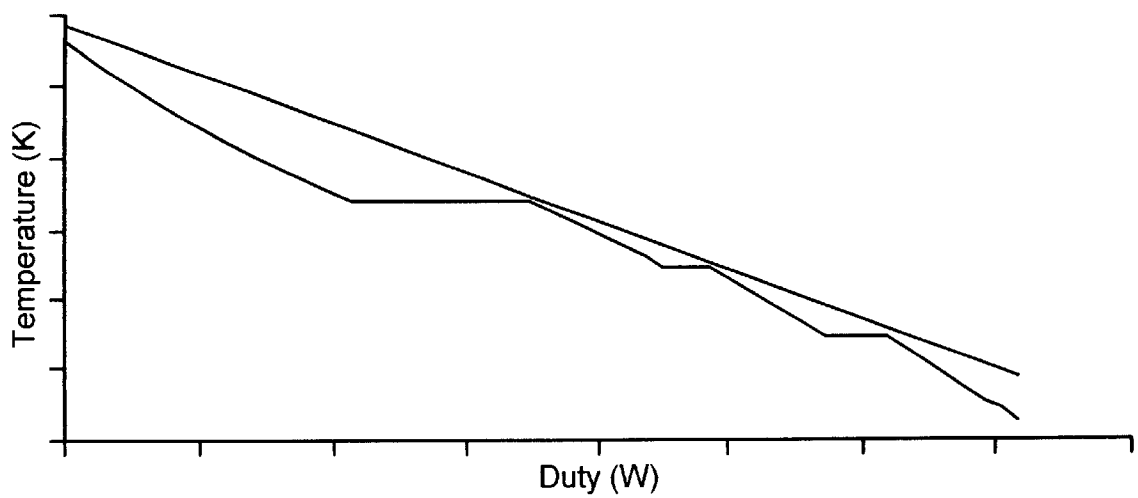
FIG. 2 is a graph depicting the cooling curve for the HRSG of a typical process depicted in FIG. 1.

According to a first aspect of the present invention, there is provided a process for the production of power from hydrocarbon fuel gas, said process comprising:

generating exothermically a first fuel gas;

compressing an oxidant gas to produce compressed oxidant gas;

combusting a second fuel gas in the presence of at least a portion of said compressed oxidant gas to produce combustion product gas;

expanding at least a portion of said combustion product gas to produce expanded combustion product gas;

at least partially vaporising pre-heated water by heat exchange against at least a portion of said first fuel gas to produce an at least partially vaporized water stream;

heating said at least partially vaporized water stream by heat exchange against expanded combustion product gas to produce a heated first steam stream; and expanding said heated first steam stream in a steam turbine system having more than one pressure stage to generate power and an expanded steam stream.

The steam turbine system has more than one pressure stage. Preferably, the steam turbine system has three pressure stages.

The heated first steam stream may be expanded in any of the pressure stages. The higher the pressure of water, the lower the value of the latent heat per kilogram and, thus, the greater the amount of steam produced per unit heat. In preferred embodiments, the heated first steam stream is, therefore, expanded in the highest pressure stage The heated first steam stream may be at a pressure of from 100 atm. (10 MPa) to 200 atm. (20 MPa). Preferably, the heated first steam stream is at a pressure of from 125 atm. (13 MPa) to 175 atm. (18 MPa) and more preferably at a pressure of about 150 atm. (15 MPa).

The pre-heated water may be produced by heating water by heat exchange against expanded combustion product gas. Preferably, the pre-heated water is at its saturation temperature.

The oxidant gas preferably comprises oxygen. In preferred embodiments, the oxidant gas is selected from air or oxygen.

The first and second fuel gases may comprise any combustible gas. However, it is preferred that the first fuel gas comprise hydrogen. For example, the first fuel gas may comprise synthesis gas. Preferably, the second fuel gas comprises at least a portion of the first fuel gas or a gas derived therefrom.

Where the first fuel gas is synthesis gas, the process may further comprise:

reacting hydrocarbon feed gas with steam and/or an oxygen-containing gas in a synthesis gas generation system to produce a synthesis gas stream; and at least partially vaporising the pre-heated water by heat exchange against the synthesis gas stream to produce the at least partially vaporized water stream and a cooled synthesis gas stream.

The synthesis gas generation system may comprise at least one reactor selected from a partial oxidation reactor ("POX"), a gas heated reformer ("GHR") (for example, a steam/methane reformer) or an autothermal reformer ("ATR"). Preferably, the synthesis gas generation system comprises an ATR, in which case the process would comprise reacting hydrocarbon feed gas with steam in the presence of an oxygen-containing gas to produce synthesis gas.

At least a portion of any steam requirement for generating the synthesis gas may be provided by a portion of the expanded steam stream. In such process embodiments, the additional thermal integration of the process improves the overall efficiency.

The proportion of hydrogen gas in the synthesis gas may be increased by reacting a portion of the carbon monoxide with steam to produce heat and a hydrogen-enriched synthesis gas stream in a shift reactor. At least a portion of the steam requirement for the shift reaction is provided by a feed steam stream produced from a first cooling duty water stream by heat exchange against the hydrogen-enriched synthesis gas stream. Such process embodiments may further comprise removing carbon dioxide from the hydrogen-enriched synthesis gas stream using an MDEA cycle wherein an MDEA recycle stream is heated against a portion of a second steam stream produced by heat exchange against expanded combustion fuel gas. In such embodiments, the second steam stream may comprise water from a cooled water stream produced from a second cooling duty water stream by heat exchange against the hydrogen-enriched synthesis gas stream or a stream derived therefrom.

The hydrocarbon feed gas preferably comprises natural gas and the oxygen-containing gas is preferably selected from air or oxygen.

Rather than producing the first fuel gas from hydrocarbon feed gas, the first fuel gas may be generated by the gasification of carbonaceous feedstock such as coal or oil.

According to a second aspect of the present invention, there is provided apparatus for carrying out the process of the first aspect of the present invention, said apparatus comprising:

a reactor system for generating exothermically a first fuel gas;

compressing means for compressing an oxidant gas to produce a compressed oxidant gas;

combusting means for combusting a second fuel gas in the presence of said compressed oxidant gas to produce combustion product gas;

expanding means for expanding at least a portion of said combustion product gas to produce expanded combustion product gas;

first heat exchange means for at least partially vaporizing pre-heated water against at least a portion of said first fuel gas to produce an at least partially vaporized water stream;

conduit means for carrying a stream of said first fuel gas from the reactor system to the first heat exchange means;

second heat exchange means for heating the at least partially vaporized water stream by heat exchange against expanded combustion product gas to produce a heated first steam stream;

conduit means for carrying expanded combustion product gas from the expanding means to the second heat exchange means conduit means for carrying said at least partially vaporized water stream from the first heat exchange means to the second heat exchange means;

a steam turbine system having more than one pressure stage for expanding said heated first steam stream to produce an expanded steam stream; and conduit means for carrying said heated first steam stream from the second heat exchange means to said steam turbine system.

In preferred embodiments, the apparatus is adapted to carry out any combination of the preferred features of the process according to the first aspect of the present invention.

A plant generating power from the combustion of synthesis gas typically consists of at least a gas turbine, a HRSG and three stages of steam turbine.

Figure 3:
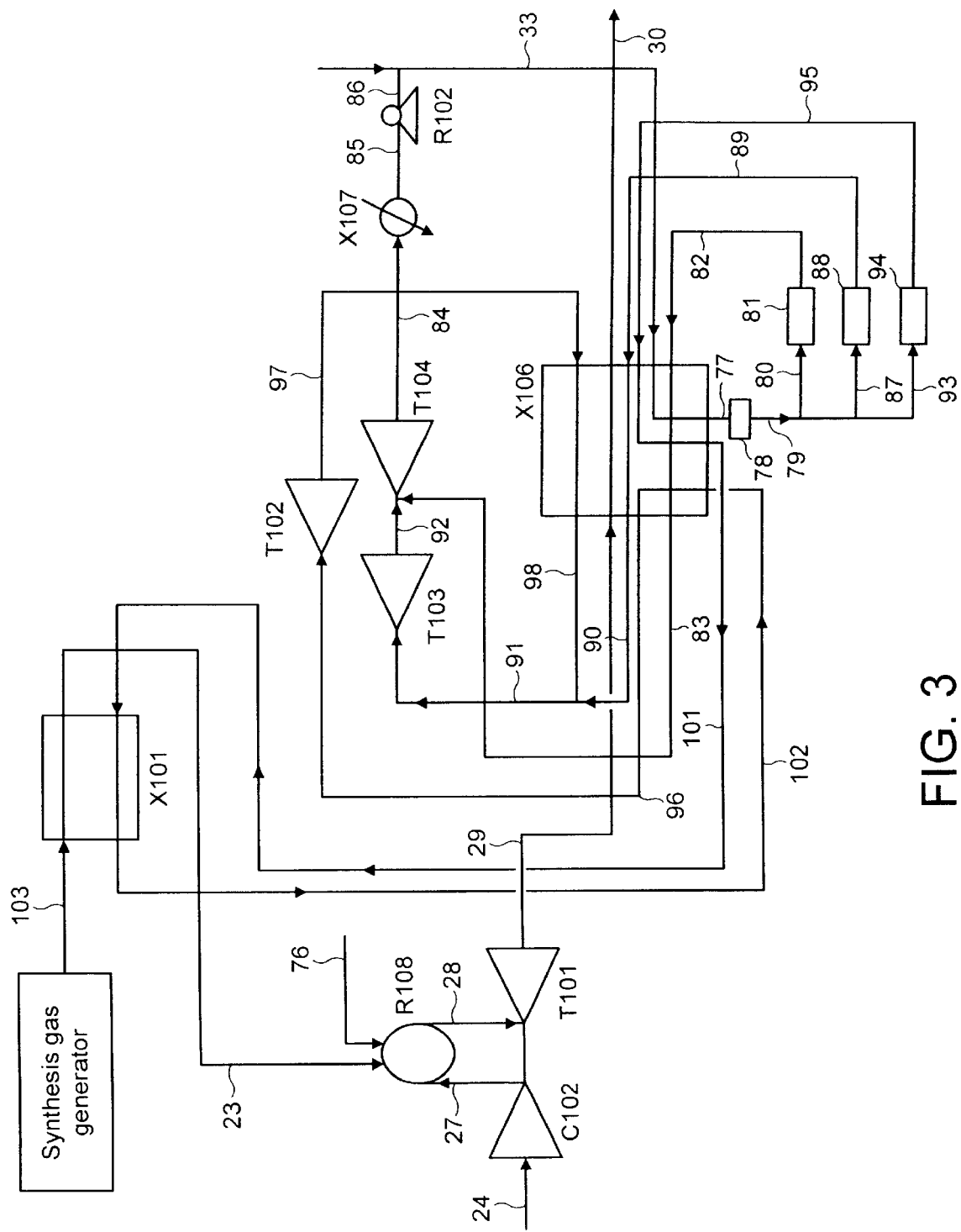
FIG. 3 is the flow sheet of FIG. 1 depicting an embodiment the present invention.

The embodiment of the process depicted in the flow sheet of FIG. 3 is similar to that depicted in the flow sheet of FIG. 1 discussed earlier. However, in FIG. 3, high pressure water is removed as stream 101 from the HRSG at about its saturation temperature. Stream 101 is fed to a waste heat boiler X-101 where it is at least partially vaporized against a stream 103 of synthesis gas to produce an at least partially vaporized water stream 102. Stream 102 is heated in the HRSG to produce the high pressure steam stream 96.

Figure 4:
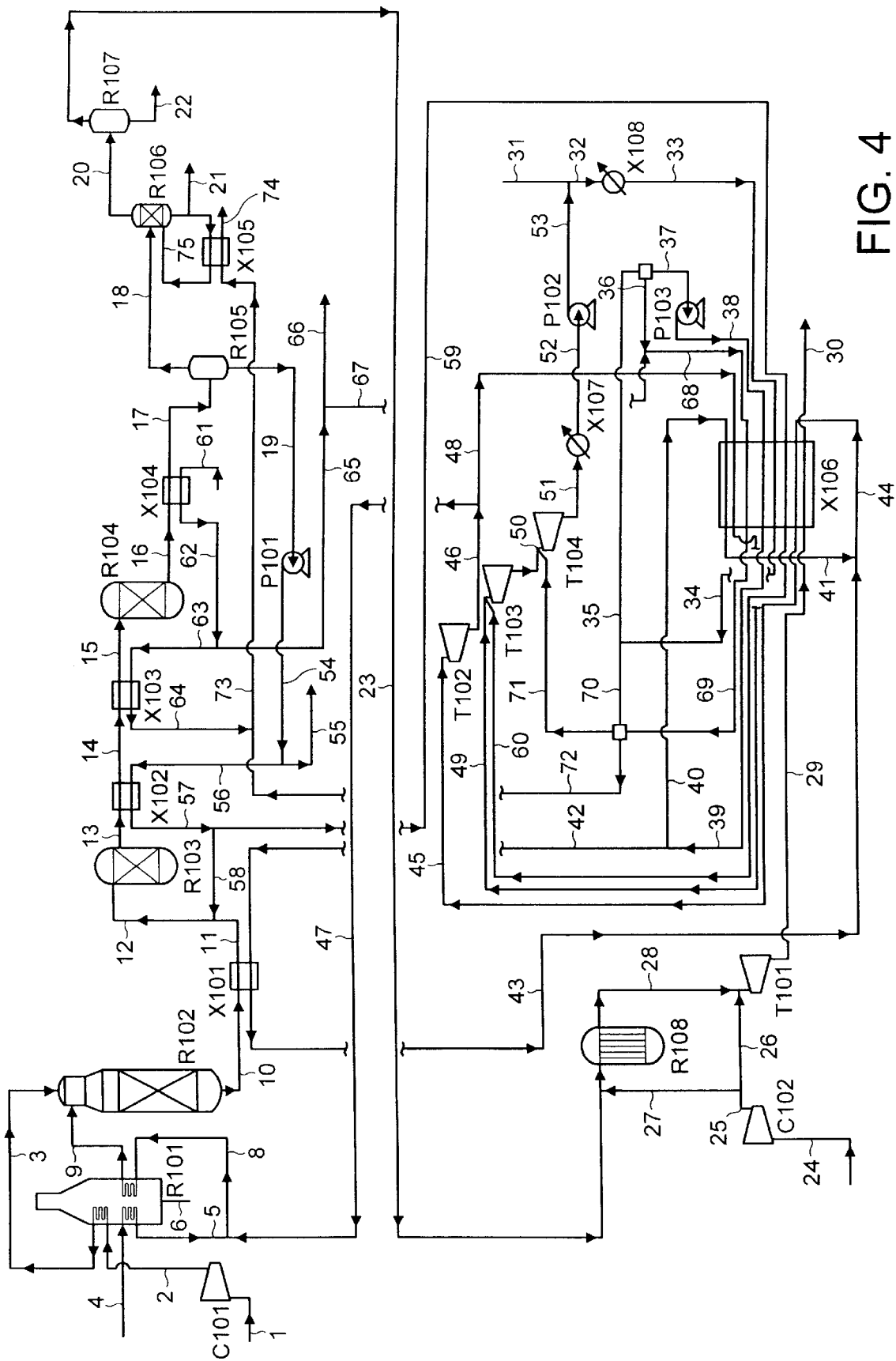
FIG. 4 is a detailed flow sheet of an embodiment of the present invention.

Referring to FIG. 4, a stream 4 of natural gas at about 35 atm. (3.5 MPa, "medium pressure") is fed to an indirect gas fired heater R-101, fuelled by fuel stream 6, where it is pre-heated to about 350° C. The heated natural gas stream 5 is then combined with a stream 47 of medium pressure steam. The combined stream 8 is further preheated in the heater R-101 to about 550° C. and is then fed as a stream 9 to an ATR R-102. The ratio of steam to carbon in the stream 9 is about 1:1.

A feed air stream 1 is fed to a compressor C-101 to produce a medium pressure feed air stream 2 which is preheated to about 900° C. in the heater R-101 and then fed to the ATR as a stream 3. In the ATR, the natural gas and the steam undergo exothermic reaction in the presence of the air to produce a synthesis gas stream 10 at a temperature of about 1060° C.

The synthesis gas stream 10 is cooled in a heat exchanger X-101 to form a cooled gas stream 11 at a temperature of about 360° C. The stream 10 is cooled against a stream 42 of water at a pressure of about 150 atm. (15 MPa, "high pressure") that is at a temperature of just below its boiling point, i.e. at about 320° C. The high pressure water, pre-heated in the HRSG X-106, vaporizes to form a stream 43 of medium pressure steam that is fed back to the HRSG.

The synthesis gas stream 11 is combined with a stream 58 of medium pressure steam to form a vapor stream 12 at a temperature of about 335° C. having a ratio of steam to carbon of about 0.9:1. The stream 12 is fed to a high temperature shift reactor or "HTS" R-103 in which some of the carbon monoxide is shifted to hydrogen according to the following exothermic water gas shift reaction:

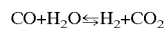

$$CO + H_2O \rightleftharpoons H_2 + CO_2$$

A medium pressure hydrogen-rich vapor stream 13 leaves the HTS at a temperature of about 436° C. and is cooled in a heat exchanger X-102 to form a stream 14 of cooled vapor at a temperature of 205° C. The stream 13 is cooled against a medium pressure stream 56 of pre-heated water. Medium pressure water, recycled from a downstream phase separation unit R-105, is vaporized to form a stream 57 of steam that is divided into streams 58 and 59. The stream 58 is combined with the synthesis gas stream 11 to form the HTS feed stream 12. The stream 59 is fed to the HRSG in the power plant.

The stream 14 is further cooled in a heat exchanger X-103 against a two-phase stream 63 of water at a pressure of about 4 atm. (0.4 MPa, "low pressure"), which vaporizes to form a vapor stream 64. The cooled synthesis gas stream 15 is fed to a low temperature shift reactor or "LTS" R-104 at about 180° C. and is subjected to a further exothermic shift reaction in which some of the carbon monoxide is shifted to hydrogen. A medium pressure hydrogen-rich vapor stream 16 is removed from the LTS.

The stream 16 is cooled from about 209° C. to form a medium pressure two-phase stream 17 at a temperature of about 40° C. in a heat exchanger X-104 against a low pressure stream 61 of water which, in turn, is partially vaporized to form a two-phase low pressure water stream 62. The stream 62 is divided into streams 63 and 65. The stream 63 is used to cool the hydrogen-rich vapor stream 14 in the heat exchanger X-103 and at least a portion of the stream 65 is fed to the HRSG of the power plant. A portion 66 of the stream 65 may be removed as an excess 4 atm. (0.4 MPa) pre-heat stream.

The two-phase stream 17 is fed to a phase separation unit R-105. The liquid phase is removed from the unit as a medium pressure water stream 19 and is pumped P-101 and scrubbed to remove particles. The stream 54 of scrubbed water is divided into streams 56 and 55. The stream 56 is used to feed the heat exchanger X-102 and the stream 55 is fed to the power plant where it is converted into steam in the HRSG.

The vapor phase is removed from the unit R-105 and fed as a medium pressure stream 18 to a two-stage activated MDEA system R-106, R-107 in which the carbon dioxide is removed from the stream as a product stream 21 and may be compressed and used for enhanced oil recovery or may be sequestered underground. The MDEA is regenerated in recycle stream 75 using a low-pressure stream 73, a portion of which is supplied via line 64 from the heat exchanger X-103 and a remaining portion 72 is supplied from the HRSG. Stream 22 is removed from the MDEA system as waste and the hydrogen-rich vapor 23 is then fed as fuel at about 40° C. and about 24.1 atm. (2.4 MPa) to a combustor R-108.

The power plant consists of a gas turbine, a HRSG and three levels of steam turbine. A stream 24 of feed air is compressed C-102 and the compressed feed air stream 25 is divided into streams 26 and 27. The stream 26 is fed to a gas turbine T-101 where it is expanded to near atmospheric pressure. The stream 27 is fed to a combustor R-108 whereupon it is used to burn the fuel 23. A stream 28 comprising gaseous combustion products at about 585° C. is fed to the gas turbine T-101 where it is expanded with the air stream 26 to produce an exhaust stream 29 and power. The stream 29 is fed to a heat exchanger in the HRSG X-106 where it is cooled to about 65° C. The cooled stream 30 is vented.

If oxygen is used in place of air in the synthesis gas generation process, then the medium pressure hydrogen-rich fuel stream 23 will not comprise nitrogen. The lack of nitrogen has the effect of reducing the power generated by the turbine T-101. In this embodiment, nitrogen may be added to the combustor R-108 thereby increasing the gaseous mass fed to the gas turbine T-101 and, in turn, increasing the amount of power produced.

A feed water stream 31 is fed to a condenser X-108 to form a condensed water stream 33 at about 20° C. The stream 33 is fed to the HRSG where it is heated against the cooling stream 29 to form a heated water stream 34 at about 99° C. Low pressure gaseous water 70 is bubbled through the stream 34 to form a water stream 35 which is fed as a stream 37 to a pump P-103 where it is pumped to the high pressure.

The high-pressure water stream 38 is fed to the HRSG where it is heated to about 320° C. The heated water stream 39 is divided into streams 40 and 42. The stream 40 is returned to the HRSG where it is vaporized to produce a stream 41 of steam at about 342° C. The stream 42 is fed to the heat exchanger X-101 where it is vaporized by heating to about 342° C. against the cooling product stream 10 from the ATR. The stream 43 of high-pressure steam is removed from the heat exchanger X-101 and combined with stream 41 to form a high-pressure steam stream 44. The stream 44 is fed to the HRSG where it is superheated to about 560° C. and the superheated stream 45 is fed to a high-pressure steam turbine T-102. The stream 45 is expanded in the turbine to produce power and a medium pressure stream 46 of steam.

The stream 46, at a temperature of about 345° C., is divided into streams 47 and 48. The stream 47 is combined with the pre-heated stream 5 of medium pressure natural gas in the synthesis gas generation process. The stream 48 fed to the HRSG where it is heated to 560° C. to produce stream 49. The stream 49 is fed to a medium pressure steam turbine T-103 where it is expanded to produce power and a low-pressure stream 50 of steam at about 283° C. The stream 50 is fed directly to a low-pressure steam turbine T-104 where it is expanded to produce a two phase stream 51 of water at about 21° C. and about 0.03 atm. (3 KPa, "lower pressure"), together with power. The stream 51 is condensed in condenser X-107 and the condensed stream 52 is pumped in pump P-102 to produce a low-pressure stream 53 of water that is recycled via line 32 to the feed water stream 33.

The medium pressure stream 59 of steam, originating from the exchanger X-102 in the HTS part of the synthesis gas generation plant, is fed to the HRSG where is heated to produce a stream 60 of heated steam at 560° C. The stream 60 is fed to the medium pressure steam turbine T-103 where it is expanded with the stream 49 to form the medium pressure stream 50 of steam and power.

The low pressure, two-phase stream 67 of water, at a temperature of about 144° C., is combined with a portion 36 of stream 35 of water at 99° C. and the combined two phase stream 68 is fed to the HRSG where it is reheated to about 144° C. and vaporized. The resultant low-pressure stream 69 of steam is divided into streams 70, 71 and 72. The stream 70 is bubbled through the water stream 34. The stream 71 is fed directly to the low-pressure steam turbine T-104 where it is expanded with the stream 50 to produce the lower pressure stream 51 and power. The stream 72 is combined with the low-pressure stream 64 from the heat exchanger X-103 to form the stream 73 which is fed to the heat exchanger X105 of the carbon dioxide removal system in the synthesis gas generation plant to produce an excess low pressure pre-heat stream 74.

Temperature, pressure and composition data regarding each stream of the exemplified process is shown in Table 1.

TABLE 1

Heat and Material Balance for Process in FIG. 4

HEAT & MATERIAL BALANCE

| STREAM No. | | 1 | 2 | 3 | 4 | 5 | 6 | 8 | 9 | 10 | 11 | 12 | 13 | 14 | 15 | 16 |
|---|---|---|---|---|---|---|---|---|---|---|---|---|---|---|---|---|
| Composition - Dry (mol %) | | | | | | | | | | | | | | | | |
| Nitrogen | | 77.00% | 77.24% | 77.24% | 0.58% | 0.58% | 0.58% | 0.25% | 0.25% | 33.81% | 33.81% | 29.22% | 29.22% | 29.22% | 29.22% | 29.22% |
| Argon | | 1.00% | 1.00% | 1.00% | 0.00% | 0.00% | 0.00% | 0.00% | 0.00% | 0.44% | 0.44% | 0.38% | 0.38% | 0.38% | 0.38% | 0.38% |
| Oxygen | | 21.50% | 21.57% | 21.57% | 0.00% | 0.00% | 0.00% | 0.00% | 0.00% | 0.00% | 0.00% | 0.00% | 0.00% | 0.00% | 0.00% | 0.00% |
| Hydrogen | | 0.00% | 0.00% | 0.00% | 0.00% | 0.00% | 0.00% | 34.32% | 34.32% | 31.13% | 31.13% | 26.91% | 35.90% | 35.90% | 35.90% | 38.41% |
| Methane | | 0.00% | 0.00% | 0.00% | 79.55% | 79.55% | 79.55% | 4.07% | 4.07% | 0.14% | 0.14% | 0.12% | 0.12% | 0.12% | 0.12% | 0.12% |
| Ethane | | 0.00% | 0.00% | 0.00% | 9.43% | 9.43% | 9.43% | 1.89% | 1.89% | 0.00% | 0.00% | 0.00% | 0.00% | 0.00% | 0.00% | 0.00% |
| Propane | | 0.00% | 0.00% | 0.00% | 4.39% | 4.39% | 4.39% | 0.72% | 0.72% | 0.00% | 0.00% | 0.00% | 0.00% | 0.00% | 0.00% | 0.00% |
| Butane | | 0.00% | 0.00% | 0.00% | 1.66% | 1.66% | 1.66% | 0.19% | 0.19% | 0.00% | 0.00% | 0.00% | 0.00% | 0.00% | 0.00% | 0.00% |
| Pentane | | 0.00% | 0.00% | 0.00% | 0.45% | 0.45% | 0.45% | 0.10% | 0.10% | 0.00% | 0.00% | 0.00% | 0.00% | 0.00% | 0.00% | 0.00% |
| Hexane | | 0.00% | 0.00% | 0.00% | 0.23% | 0.23% | 0.23% | 0.00% | 0.00% | 0.00% | 0.00% | 0.00% | 0.00% | 0.00% | 0.00% | 0.18% |
| Carbon monoxide | | 0.00% | 0.00% | 0.00% | 3.71% | 3.71% | 3.71% | 1.60% | 1.60% | 13.52% | 13.52% | 11.69% | 2.69% | 2.69% | 2.69% | 14.76% |
| Carbon Dioxide | | 0.00% | 0.00% | 0.00% | 0.00% | 0.00% | 0.00% | 56.85% | 56.85% | 3.78% | 3.78% | 3.26% | 12.26% | 12.26% | 12.26% | 16.91% |
| Water | | 0.50% | 0.19% | 0.19% | 0.00% | 0.00% | 0.00% | 0.00% | 0.00% | 17.18% | 17.18% | 28.41% | 19.42% | 19.42% | 19.42% | |
| Molecular Weight | kg/kg mol | 28.94 | 28.97 | 28.97 | 20.82 | 20.82 | 20.82 | 19.22 | 19.22 | 18.84 | 18.84 | 18.73 | 18.73 | 18.73 | 18.73 | 18.73 |
| Flowrate - Dry | kg/h | 296115.0 | 295542.8 | 295542.8 | 67530.9 | 67530.9 | 9347.9 | 144538.1 | 144538.1 | 440080.9 | 440080.9 | 506122.9 | 506122.9 | 506122.9 | 506122.9 | |
| Flowrate - Dry | kg mol/h | 10232.1 | 10200.3 | 10200.3 | 3244.1 | 3244.1 | 449.1 | 7518.7 | 7518.7 | 23358.0 | 23358.0 | 27024.0 | 27024.0 | 27024.0 | 27024.0 | |
| Phase | | 2-PHASE | VAPOUR | VAPOUR | 2-PHASE | VAPOUR | 2-PHASE | VAPOUR | VAPOUR | VAPOUR | VAPOUR | VAPOUR | VAPOUR | VAPOUR | VAPOUR | VAPOUR |
| Pressure | bara | 1.01 | 35.00 | 35.00 | 35.00 | 35.00 | 35.00 | 35.00 | 35.00 | 35.00 | 35.00 | 35.00 | 35.00 | 35.00 | 35.00 | 35.00 |
| | Mpa | 0.10 | 3.50 | 3.50 | 3.50 | 3.50 | 3.50 | 3.50 | 3.50 | 3.50 | 3.50 | 3.50 | 3.50 | 3.50 | 3.50 | 3.50 |
| Temperature | °C. | 10.00 | 132.92 | 900.00 | 10.00 | 350.00 | 10.00 | 340.20 | 550.00 | 1058.79 | 360.00 | 335.78 | 438.51 | 205.10 | 180.00 | 209.42 |

| STREAM No. | | 17 | 18 | 19 | 20 | 21 | 23 | 24 | 25 | 26 | 27 | 28 | 29 | 30 | 31 | 32 |
|---|---|---|---|---|---|---|---|---|---|---|---|---|---|---|---|---|
| Composition - Dry (mol %) | | | | | | | | | | | | | | | | |
| Nitrogen | | 29.22 | 35.10% | 0.01% | 42.58% | 0.00% | 42.58% | 76.00% | 76.00% | 76.00% | 76.00% | 73.04% | 73.29% | 73.29% | 0.00% | 0.00% |
| Argon | | 0.38% | 0.45% | 0.00% | 0.55% | 0.00% | 0.55% | 1.00% | 1.00% | 1.00% | 1.00% | 0.96% | 0.96% | 0.96% | 0.00% | 0.00% |
| Oxygen | | 0.00% | 0.00% | 0.00% | 0.00% | 0.00% | 0.00% | 21.50% | 21.50% | 21.50% | 21.50% | 10.79% | 11.69% | 11.69% | 0.00% | 0.00% |
| Hydrogen | | 38.41 | 46.13% | 0.02% | 55.78% | 0.84% | 55.78% | 0.00% | 0.00% | 0.00% | 0.00% | 0.00% | 0.00% | 0.00% | 0.00% | 0.00% |
| Methane | | 0.12% | 0.15% | 0.00% | 0.18% | 0.00% | 0.18% | 0.00% | 0.00% | 0.00% | 0.00% | 0.00% | 0.00% | 0.00% | 0.00% | 0.00% |
| Ethane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Propane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Butane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Pentane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Hexane | | 0.18% | 0.22% | 0.00% | 0.27% | 0.00% | 0.27% | 0.00% | 0.00% | 0.00% | 0.00% | 0.00% | 0.00% | 0.00% | 0.00% | 0.00% |
| Carbon monoxide | | 14.76% | 17.68% | 0.26% | 0.33% | 0.00% | 0.33% | 0.00% | 0.00% | 0.00% | 0.00% | 0.19% | 0.17% | 0.17% | 0.00% | 0.00% |
| Carbon Dioxide | | 16.91% | 0.26% | 99.71% | 0.31% | 99.15% | 0.31% | 0.00% | 0.00% | 0.00% | 0.00% | 15.02% | 13.88% | 13.88% | 0.00% | 0.00% |
| Water | | | | | | | | 1.50% | 1.50% | 1.50% | 1.50% | | | | 100.00% | 100.00% |
| Molecular Weight | kg/kg mol | 18.73 | 18.86 | 18.08 | 13.58 | 43.65 | 13.58 | 28.84 | 28.84 | 28.84 | 28.84 | 27.09 | 27.23 | 27.23 | 18.02 | 18.02 |
| Flowrate - Dry | kg/h | 506122.9 | 424299.1 | 81823.8 | 251826.5 | 172472.5 | 251826.5 | 2007126.7 | 2007126.7 | 200712.7 | 1806414.1 | 2058243.5 | 2258956.6 | 2258956.6 | 63230.0 | 474787.7 |
| Flowrate - Dry | kg mol/h | 27024.0 | 22498.4 | 4525.6 | 18547.5 | 3950.8 | 18547.5 | 69595.4 | 69595.4 | 6959.5 | 62635.9 | 75985.7 | 82945.3 | 82945.3 | 3509.9 | 26355.1 |
| Phase | | 2-PHASE | VAPOUR | LIQUID | 2-PHASE | VAPOUR | VAPOUR | VAPOUR | VAPOUR | VAPOUR | VAPOUR | VAPOUR | VAPOUR | VAPOUR | LIQUID | LIQUID |
| Pressure | bara | 35.00 | 35.00 | 35.00 | 35.00 | 35.00 | 24.10 | 1.01 | 15.49 | 15.49 | 15.49 | 15.01 | 1.05 | 1.05 | 1.00 | 1.00 |

TABLE 1-continued

| STREAM No. | | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| Pressure | Mpa | 3.50 | 3.50 | 3.50 | 3.50 | 3.50 | 2.41 | 0.101 | 1.55 | 1.549 | 1.549 | 1.50 | 0.105 | 0.105 | 0.10 | 0.10 |
| Temperature | °C. | 40.00 | 40.00 | 40.00 | 40.00 | 40.00 | 40.00 | 15.00 | 379.78 | 379.78 | 379.78 | 1287.90 | 583.99 | 66.00 | 10.00 | 19.63 |
| Composition - Dry (mol %) | | | | | | | | | | | | | | | | |
| Nitrogen | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Argon | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Oxygen | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Hydrogen | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Methane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Ethane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Propane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Butane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Pentane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Hexane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Carbon monoxide | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Carbon Dioxide | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Water | | 100.00% | 100.00% | 100.00% | 100.00% | 100.00% | 100.00% | 100.00% | 100.00% | 100.00% | 100.00% | 100.00% | 100.00% | 100.00% | 100.00% | 100.00% |
| Molecular Weight | kg/kg mol | 18.02 | 18.02 | 18.02 | 18.02 | 18.02 | 18.02 | 18.02 | 18.02 | 18.02 | 18.02 | 18.02 | 18.02 | 18.02 | 18.02 | 18.02 |
| Flowrate - Dry | kg/h | 474787.7 | 474967.7 | 474987.7 | 0.0 | 474987.7 | 474987.7 | 474987.7 | 3134.7 | 3134.7 | 471853.0 | 471853.0 | 474987.7 | 474987.7 | 474987.7 | 77007.0 |
| Flowrate - Dry | kg mol/h | 26355.1 | 26366.2 | 26366.2 | 0.0 | 26366.2 | 26366.2 | 26366.2 | 174.0 | 174.0 | 26192.2 | 26192.2 | 26366.2 | 26366.2 | 26366.2 | 4274.6 |
| Phase | | LIQUID | LIQUID | VAPOUR | LIQUID | LIQUID | LIQUID | LIQUID | LIQUID | VAPOUR | LIQUID | VAPOUR | VAPOUR | VAPOUR | VAPOUR | VAPOUR |
| Pressure | bara | 1.00 | 1.00 | 1.00 | 1.00 | 1.00 | 0.10 | 15.00 | 15.00 | 15.00 | 15.00 | 15.00 | 15.00 | 15.00 | 35.00 | 35.00 |
| Pressure | Mpa | 0.10 | 0.10 | 0.10 | 0.10 | 0.10 | 0.10 | 320.00 | 320.00 | 320.00 | 320.00 | 15.00 | 15.00 | 15.00 | 3.50 | 3.50 |
| Temperature | °C. | 344.46 | 99.00 | 282.72 | 99.23 | 99.23 | 100.81 | 320.00 | 320.00 | 320.00 | 320.00 | 342.62 | 342.62 | 560.00 | 344.46 | 344.46 |

| STREAM No. | | 48 | 49 | 50 | 51 | 52 | 53 | 54 | 55 | 56 | 57 | 58 | 59 | 60 | 61 | 62 |
|---|---|---|---|---|---|---|---|---|---|---|---|---|---|---|---|---|
| Composition - Dry (mol %) | | | | | | | | | | | | | | | | |
| Nitrogen | | 0.00% | 0.00% | 0.00% | 0.00% | 0.00% | 0.00% | 0.01% | 0.01% | 0.01% | 0.01% | 0.00% | 0.00% | 0.00% | 0.00% | 0.00% |
| Argon | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Oxygen | | 0.00% | 0.00% | 0.00% | 0.00% | 0.00% | 0.00% | 0.02% | 0.02% | 0.02% | 0.02% | 0.00% | 0.00% | 0.00% | 0.00% | 0.00% |
| Hydrogen | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Methane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Ethane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Propane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Butane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Pentane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Hexane | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Carbon monoxide | | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| Carbon Dioxide | | 0.00% | 0.00% | 0.00% | 0.00% | 0.00% | 0.00% | 0.26% | 0.26% | 0.26% | 0.26% | 0.00% | 0.00% | 0.00% | 0.00% | 0.00% |
| Water | | 100.00% | 100.00% | 100.00% | 100.00% | 100.00% | 100.00% | 99.71% | 99.71% | 99.71% | 99.71% | 100.00% | 100.00% | 100.00% | 100.00% | 100.00% |
| Molecular Weight | kg/kg mol | 18.02 | 18.02 | 18.02 | 18.02 | 18.02 | 18.02 | 18.08 | 18.08 | 18.08 | 18.08 | 18.02 | 18.02 | 18.02 | 18.02 | 18.02 |
| Flowrate - Dry | kg/h | 397980.7 | 399980.7 | 411557.7 | 411557.7 | 411557.7 | 411557.7 | 81823.8 | 2205.8 | 79618.5 | 79618.5 | 66042.0 | 13577.0 | 13577.0 | 497345.4 | 497345.4 |
| Flowrate - Dry | kg mol/h | 20991.6 | 22091.6 | 22845.3 | 22845.3 | 22845.3 | 22845.3 | 4525.6 | 122.0 | 4403.6 | 4403.6 | 3665.9 | 753.6 | 753.6 | 27607.3 | 27607.3 |
| Phase | | VAPOUR | VAPOUR | 2-PHASE | LIQUID | LIQUID | LIQUID | LIQUID | LIQUID | LIQUID | VAPOUR | VAPOUR | VAPOUR | VAPOUR | LIQUID | 2-PHASE |
| Pressure | bara | 35.00 | 35.00 | 4.00 | 0.03 | 0.03 | 1.00 | 35.00 | 35.00 | 35.00 | 35.00 | 35.00 | 35.00 | 35.00 | 4.00 | 4.00 |
| Pressure | Mpa | 3.50 | 3.50 | 0.40 | 0.003 | 0.003 | 0.10 | 3.50 | 3.50 | 3.50 | 3.50 | 3.50 | 3.50 | 3.50 | 0.40 | 0.40 |
| Temperature | °C. | 344.46 | 560.00 | 282.72 | 21.10 | 21.10 | 21.11 | 40.00 | 40.00 | 40.00 | 242.67 | 242.67 | 242.67 | 560.00 | 10.00 | 143.57 |

TABLE 1-continued

| STREAM No. | | 63 | 64 | 65 | 66 | 67 | 68 | 69 | 70 | 72 | 73 |
|---|---|---|---|---|---|---|---|---|---|---|---|
| Composition - Dry (mol %) | | | | | | | | | | | |
| Nitrogen | | 0.00% | 0.00% | 0.00% | 0.00% | 0.00% | 0.00% | 0.00% | 0.00% | 0.00% | 0.00% |
| Argon | | 0.00% | 0.00% | 0.00% | 0.00% | 0.00% | 0.00% | 0.00% | 0.00% | 0.00% | 0.00% |
| Oxygen | | 0.00% | 0.00% | 0.00% | 0.00% | 0.00% | 0.00% | 0.00% | 0.00% | 0.00% | 0.00% |
| Hydrogen | | 0.00% | 0.00% | 0.00% | 0.00% | 0.00% | 0.00% | 0.00% | 0.00% | 0.00% | 0.00% |
| Methane | | 0.00% | 0.00% | 0.00% | 0.00% | 0.00% | 0.00% | 0.00% | 0.00% | 0.00% | 0.00% |
| Ethane | | 0.00% | 0.00% | 0.00% | 0.00% | 0.00% | 0.00% | 0.00% | 0.00% | 0.00% | 0.00% |
| Propane | | 0.00% | 0.00% | 0.00% | 0.00% | 0.00% | 0.00% | 0.00% | 0.00% | 0.00% | 0.00% |
| Butane | | 0.00% | 0.00% | 0.00% | 0.00% | 0.00% | 0.00% | 0.00% | 0.00% | 0.00% | 0.00% |
| Pentane | | 0.00% | 0.00% | 0.00% | 0.00% | 0.00% | 0.00% | 0.00% | 0.00% | 0.00% | 0.00% |
| Hexane | | 0.00% | 0.00% | 0.00% | 0.00% | 0.00% | 0.00% | 0.00% | 0.00% | 0.00% | 0.00% |
| Carbon monoxide | | 0.00% | 0.00% | 0.00% | 0.00% | 0.00% | 0.00% | 0.00% | 0.00% | 0.00% | 0.00% |
| Carbon Dioxide | | 0.00% | 0.00% | 0.00% | 0.00% | 0.00% | 0.00% | 0.00% | 0.00% | 0.00% | 0.00% |
| Water | | 100.00% | 100.00% | 100.00% | 100.00% | 100.00% | 100.00% | 100.00% | 100.00% | 100.00% | 100.00% |
| Molecular Weight | kg/kg mol | 18.02 | 18.02 | 18.02 | 18.02 | 18.02 | 18.02 | 18.02 | 18.02 | 18.02 | 18.02 |
| Flowrate - Dry | kg/h | 11153.3 | 11153.3 | 486192.1 | 434644.1 | 51548.0 | 51548.0 | 51548.0 | 200.0 | 51348.0 | 62501.2 |
| Flowrate - Dry | kg mol/h | 619.1 | 619.1 | 26988.2 | 24126.8 | 2861.4 | 2861.4 | 2861.4 | 11.1 | 2850.3 | 3469.4 |
| Phase | | 2-PHASE | VAPOUR | 2-PHASE | 2-PHASE | 2-PHASE | 2-PHASE | VAPOUR | VAPOUR | VAPOUR | VAPOUR |
| Pressure | bara | 4.00 | 4.00 | 4.00 | 4.00 | 4.00 | 4.00 | 4.00 | 4.00 | 4.00 | 4.00 |
| | Mpa | 0.40 | 0.40 | 0.40 | 0.40 | 0.40 | 0.40 | 0.40 | 0.40 | 0.40 | 0.40 |
| Temperature | °C. | 143.57 | 143.57 | 143.57 | 143.57 | 143.57 | 143.57 | 144.00 | 144.00 | 144.00 | 144.00 |

Figure 5:
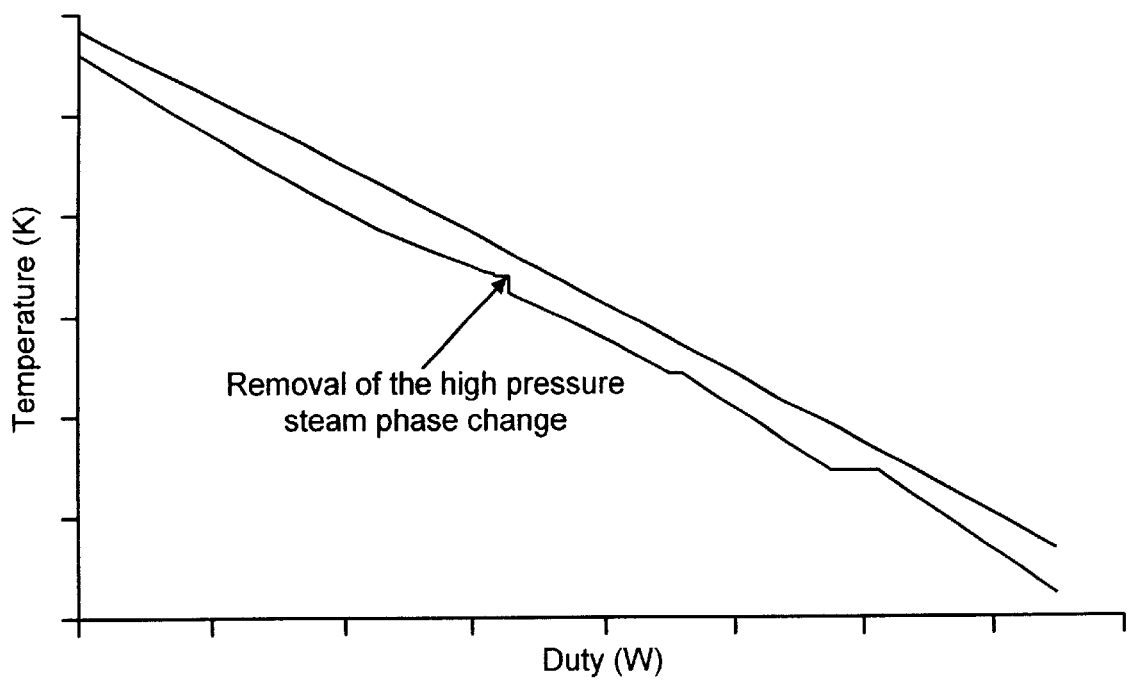
FIG. 5 is a graph depicting the cooling curve for the HRSG of the process depicted in FIG. 4.

Using the heat generated from the production of the fuel gas to provide the latent heat (or vaporization) duty for the preheated water results in more heat being available to meet the preheating and superheating duties of the HRSG. The performing of the phase change of the high pressure water in the waste heat boiler of the ATR instead of in the HRSG reduces the temperature difference between the ideal cooling curve and the actual cooling curve for the HRSG in the process depicted in FIG. 4 along the length of the two cooling curves (as shown in FIG. 5) indicating that this embodiment of the process of the present invention is more efficient that the typical prior art process depicted in FIG. 1. In addition, the use of high pressure steam to provide the cooling for the ATR effluent is beneficial because it reduces the warm end temperature difference in the waste heat boiler thereby further improving the efficiency of the process.

The use of a gas comprising predominantly hydrogen as the fuel gas for the combustion stage of the gas turbine system means that relatively little carbon dioxide is produced as part of the turbine exhaust. The carbon dioxide can be produced as a relatively pure stream that can be used for enhanced oil recovery or can be sequestered in an aquifer.

It will be appreciated that the invention is not restricted to the details described above with reference to the preferred embodiments but that numerous modifications and variations can be made without departing from the spirit or scope of the invention as defined in the following claims.

What is claimed is:

1. A process for generating power comprising:
   generating exothermically a first fuel gas;
   compressing an oxidant gas to produce compressed oxidant gas;
   combusting a second fuel gas in the presence of at least a portion of said compressed oxidant gas to produce combustion product gas, wherein the second fuel gas comprises at least a portion of the first fuel gas or a gas derived therefrom;
   expanding at least a portion of said combustion product gas to produce expanded combustion product gas;
   at least partially vaporizing pre-heated water by heat exchange against at least a portion of said first fuel gas to produce an at least partially vaporized water stream;
   heating said at least partially vaporized water stream by heat exchange against expanded combustion product gas to produce a heated first steam stream at a pressure of from 10 MPa (100 atm.) to 20 MPa (200 atm.); and
   expanding said heated first steam stream in the highest pressure stage of a steam turbine system having more than one pressure stage to generate power and an expanded steam stream.

2. The process according to claim 1 wherein the heated first steam stream is at a pressure of from 13 MPa (125 atm.) to 18 MPa (175 atm.).

3. The process according to claim 1 wherein the heated first steam stream is at a pressure of about 15 MPa (150 atm.).

4. The process according to claim 1 wherein the pre-heated water is produced by heating water by heat exchange against expanded combustion product gas.

5. The process according to claim 1 wherein the temperature of the pre-heated water is its saturation temperature.

6. The process according to claim 1 wherein the oxidant gas is selected from the group consisting of air and oxygen.

7. The process according to claim 1 wherein the first fuel gas comprises hydrogen.

8. The process according to claim 1 wherein the first fuel gas comprises synthesis gas, the process further comprising reacting hydrocarbon feed gas with steam and/or an oxygen-containing gas in a synthesis gas generation system to produce a synthesis gas stream.

9. The process according to claim 8 wherein the synthesis gas generation system comprises at least one reactor selected from a partial oxidation reactor ("POX"), a gas heated reformer ("GHR") or an autothermal reformer ("ATR").

10. The process according to claim 8 wherein the synthesis gas generation system comprises an ATR, said process comprising reacting hydrocarbon feed gas with steam in the presence of an oxygen-containing gas to produce synthesis gas.

11. The process according to claim 8 wherein at least a portion of any steam requirement for generating the synthesis gas is provided by a portion of the expanded steam stream.

12. The process according to claim 8 further comprising increasing the proportion of hydrogen gas in the synthesis gas stream by reacting a portion of the carbon monoxide with steam to produce heat and a hydrogen-enriched synthesis gas stream wherein at least a portion of the steam requirement for the shift reaction is provided by a feed steam stream produced from a first cooling duty water stream by heat exchange against the hydrogen-enriched synthesis gas stream.

13. The process according to claim 12 further comprising removing carbon dioxide from the hydrogen-enriched synthesis gas stream using an MDEA cycle wherein an MDEA recycle stream is heated against a portion of a second steam stream produced by heat exchange against expanded combustion fuel gas.

14. The process according to claim 13 wherein the second steam stream comprises water from a cooled water stream produced from a second cooling duty water stream by heat exchange against the hydrogen-enriched synthesis gas stream or a stream derived therefrom.

15. The process according to claim 1 wherein said first fuel gas is generated by the gasification of carbonaceous feedstock.

16. A process for generating power comprising:
   generating exothermically synthesis gas;
   compressing a gas containing molecular oxygen to produce compressed oxidant gas;
   combusting hydrogen in the presence of at least a portion of said compressed oxidant gas to produce combustion product gas;
   expanding at least a portion of said combustion product gas to produce expanded combustion product gas;
   at least partially vaporising pre-heated water by heat exchange against at least a portion of said synthesis gas to produce an at least partially vaporized water stream;
   heating said at least partially vaporized water stream by heat exchange against expanded combustion product gas to produce a heated first steam stream at a pressure of from 10 MPa (100 atm.) to 20 MPa (200 atm.);
   feeding said heated first steam stream to a steam turbine system having three pressure stages; and
   expanding said heated first steam stream in the highest pressure stage of the steam turbine system to generate power and an expanded steam stream.

17. Apparatus for carrying out a process for generating power, said apparatus comprising:
   a reactor system for generating exothermically a first fuel gas;
   compressing means for compressing an oxidant gas to produce a compressed oxidant gas;

combusting means for combusting a second fuel gas in the presence of said compressed oxidant gas to produce combustion product gas;

expanding means for expanding at least a portion of said combustion product gas to produce expanded combustion product gas;

first heat exchange means for at least partially vaporizing pre-heated water against at least a portion of said first fuel gas to produce an at least partially vaporized water stream;

conduit means for carrying a stream of said first fuel gas from the reactor system to the first heat exchange means;

second heat exchange means for heating the at least partially vaporized water stream by heat exchange against expanded combustion product gas to produce a heated first steam stream at a pressure of from 10 MPa (100 atm.) to 20 MPa (200 atm.);

conduit means for carrying expanded combustion product gas from the expanding means to the second heat exchange means;

conduit means for carrying said at least partially vaporized water stream from the first heat exchange means to the second heat exchange means;

a steam turbine system having more than one pressure stage for expanding said heated first steam stream to produce an expanded steam stream; and conduit means for carrying said heated first steam stream from the second heat exchange means to the highest pressure stage of said steam turbine system.

* * * * *